US010557746B2

(12) United States Patent
Konermann

(10) Patent No.: US 10,557,746 B2
(45) Date of Patent: Feb. 11, 2020

(54) GRANULE DOSING SYSTEM FOR PLASTIC PROCESSING MACHINES

(71) Applicant: Plast-Control GmbH, Remscheid (DE)

(72) Inventor: Stefan Konermann, Remscheid (DE)

(73) Assignee: Plast-Control GmbH, Remscheid (DE)

( * ) Notice: Subject to any disclaimer, the term of this patent is extended or adjusted under 35 U.S.C. 154(b) by 266 days.

(21) Appl. No.: 15/541,051

(22) PCT Filed: Dec. 3, 2015

(86) PCT No.: PCT/EP2015/078546
§ 371 (c)(1),
(2) Date: Jun. 30, 2017

(87) PCT Pub. No.: WO2016/110366
PCT Pub. Date: Jul. 14, 2016

(65) Prior Publication Data
US 2018/0017431 A1    Jan. 18, 2018

(30) Foreign Application Priority Data

Jan. 5, 2015 (EP) ..................................... 15150085

(51) Int. Cl.
*G01G 19/24* (2006.01)
*G01G 21/22* (2006.01)
(Continued)

(52) U.S. Cl.
CPC ........... *G01G 19/24* (2013.01); *G01G 11/086* (2013.01); *G01G 13/003* (2013.01); *G01G 21/22* (2013.01); *G01G 21/23* (2013.01); *G01G 23/00* (2013.01)

(58) Field of Classification Search
CPC .... G01G 11/086; G01G 13/003; G01G 19/24; G01G 21/22; G01G 21/23; G01G 23/00
See application file for complete search history.

(56) References Cited

U.S. PATENT DOCUMENTS 3,593,813 A * 7/1971 Kitaba .................. G01G 13/00
177/105
3,623,560 A * 11/1971 Stone ........................ B65B 3/28
177/109

(Continued)

FOREIGN PATENT DOCUMENTS

DE         2225798 A1   12/1973
JP       2001-147151 A    5/2001
JP       2001-296178 A   10/2001

*Primary Examiner* — Natalie Huls
(74) *Attorney, Agent, or Firm* — Richard M. Goldberg

(57) ABSTRACT

A granule-dosing system for plastics processing machines including a weighing container removably retained in an operating position on a framework; a plurality of supply containers having outlets which are connected to an inlet of the weighing container via dosing mechanisms; a mixer with an inlet which is connected to an outlet of the weighing container; and a safety switch and a control device designed to switch off the dosing mechanisms and/or the mixer when the safety switch emits a switch-off signal, wherein the weighing container is configured such that, in the operating position, it blocks access to the dosing mechanisms and/or to the inlet of the mixer, and the safety switch is arranged on the framework such that it emits the switch-off signal when the weighing container is removed from the operating position.

6 Claims, 4 Drawing Sheets

(51) Int. Cl.
*G01G 21/23* (2006.01)
*G01G 23/00* (2006.01)
*G01G 11/08* (2006.01)
*G01G 13/00* (2006.01)

(56) References Cited

U.S. PATENT DOCUMENTS

| | | | | |
|---|---|---|---|---|
| 4,222,496 A | * | 9/1980 | Start | G01G 13/32 177/70 |
| 4,667,503 A | * | 5/1987 | Loos | G01G 19/24 366/141 |
| 4,669,634 A | * | 6/1987 | Leroux | B65B 37/18 177/114 |
| 4,793,512 A | * | 12/1988 | Krauss | G01G 11/08 222/1 |
| 4,812,047 A | * | 3/1989 | Baumann | G01G 19/24 222/399 |
| 4,954,975 A | * | 9/1990 | Kalata | G01G 11/08 177/59 |
| 5,670,751 A | * | 9/1997 | Hafner | G01G 11/08 177/1 |
| 6,467,943 B1 | * | 10/2002 | Maguire | B01F 7/00175 141/83 |
| 2017/0348886 A1 | * | 12/2017 | Fux | G01G 19/24 |

\* cited by examiner

GRANULE DOSING SYSTEM FOR PLASTIC PROCESSING MACHINES

BACKGROUND OF THE INVENTION

The invention relates to a granule dosing system for plastics processing machines comprising: a weighing container removably retained in an operating position on a framework; a plurality of supply containers having outlets which are connected to an inlet of the weighing container via dosing mechanisms; a mixer with an inlet which is connected to an outlet of the weighing container; and a safety switch and a control device designed to switch off the dosing mechanisms and/or the mixer when the safety switch emits a switch-off signal.

Systems of this type serve for mixing plastics granules of different types in a predetermined ratio, so that the mixture can then be processed further in plastifier and, for example, an extruder connected to the downstream side of the plastifier. The dosing mechanisms are in most cases configured as gate valves. When one of the gate valves is opened, the granules from the corresponding supply container trickle into the weighing container which is supported on one or more weighing cells, so that the increase in weight of the weighing container can be monitored. When the specified amount of granules of the pertinent type has been supplied, the gate valve is closed, and suitable amounts of granules of other types are dosed-in in the same manner. When the mixer has been emptied sufficiently and is ready to receive a new batch of granules, the outlet of the weighing container is opened, so that the granules can be introduced into the mixer.

The gate valves and also the mixer have to be cleaned from time to time by the operator. Then, the open outlets of the supply containers provide access to the gate valves, and the open inlet of the mixer provides access to the interior of the mixer. However, in order to avoid a risk of injury, the dosing mechanisms and the mixer must be secured against human access while the system is running. Conventionally, this has in most cases been achieved by encapsulating the entire system in an enclosure which has a door that is secured by the safety switch.

However, the enclosure results in an increased space requirement, all the more since additional space must be provided for enabling the door to be opened. This requirement for large installation space is a particular disadvantageous because the dosing system is usually installed directly at the location of an extrusion plant which may comprise a plurality of extruders, so that the available space is limited. When, on the other hand, the dimensions of the enclosure are reduced, this limits the moving space for the operator performing the maintenance and the cleaning works.

SUMMARY OF THE INVENTION

It is therefore an object of the invention to provide a more compact granule dosing system.

According to the invention, in order to achieve this object, the weighing container is configured such that, in the operating position, it blocks access to the dosing mechanisms and/or to the inlet of the mixer, and the safety switch is arranged on the framework such that it emits the switch-off signal when the weighing container is removed from the operating position.

Thus, according to the invention, the system is protected against hazardous access directly by the weighing container, so that an enclosure and a door can be dispensed with.

Useful details and further developments of the invention are indicated in the dependent claims.

BRIEF DESCRIPTION OF THE DRAWINGS

An embodiment example will now be explained in conjunction with the drawings, wherein.

DETAILED DESCRIPTION

Figure 1:
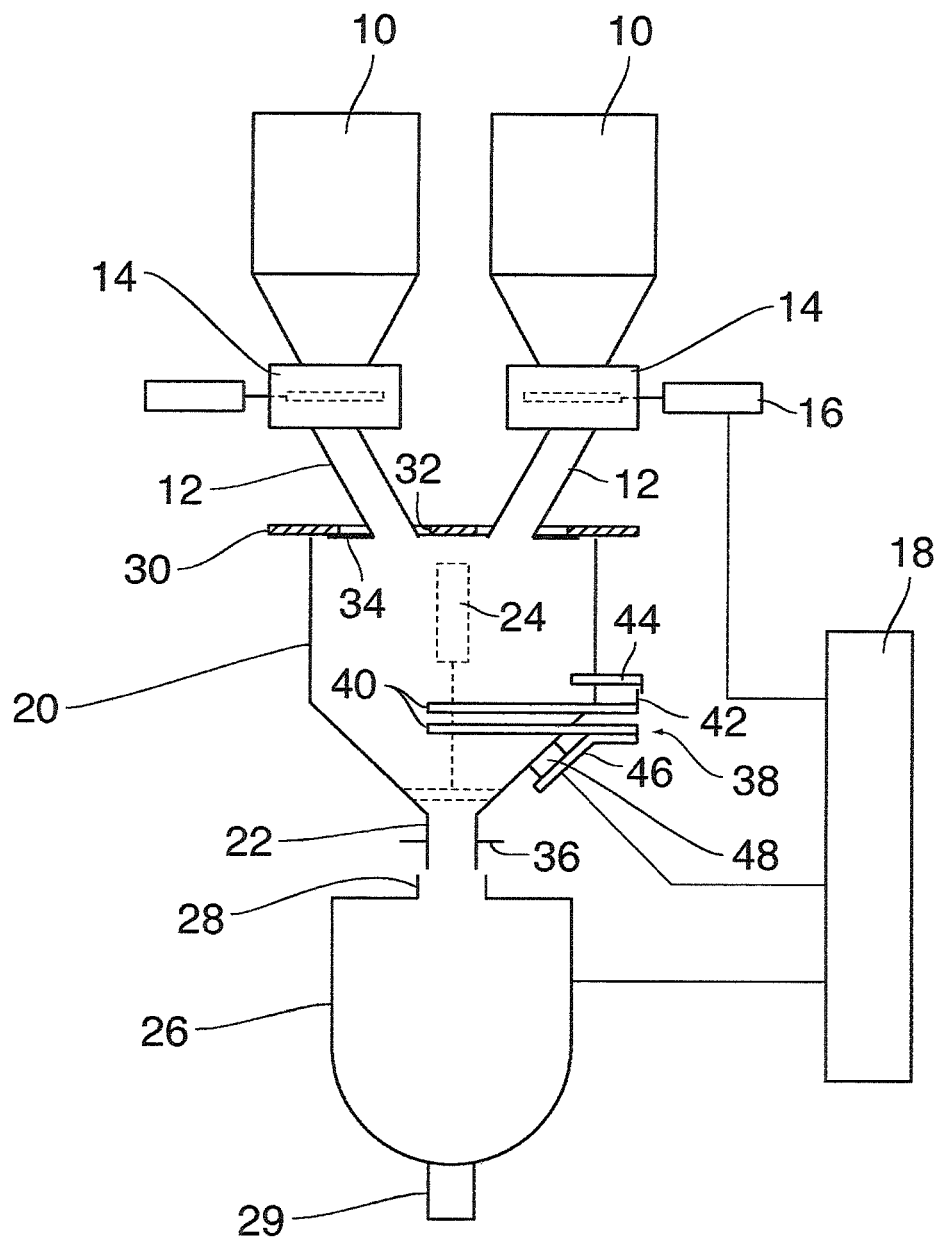
FIG. 1 is schematic side view of a dosing system according to the invention.

The system shown in FIG. 1 has several supply containers 10 only two of which have been shown here. Each supply container has an outlet 12 which can be blocked by means of a dosing mechanism 14 configured as a valve. Drive systems 16 for the dosing mechanisms 14 are controlled by an electronic control system 18. The outlets 12 of the supply containers lead to an inlet of a common weighing container 20. The weighing container 20 is funnel-shaped and has an outlet 22 which can be blocked by means of a discharge device 24. Below the outlet 22 there is provided a mixer 26 the interior of which is accessible via an inlet 28 and which has an outlet 29 via which the mixture may be discharged either into a storage vessel or directly into an extruder.

Each of the funnel-shaped supply containers 10 accommodates a certain supply of plastics granulate of a specific type. For example, the granulates may differ in color, so that the mixing ratio determines the color of the plastic melt to be obtained from the granulate and, eventually, the color of the products made thereof. However, the granulates may also differ in their chemical composition. Next to the plastics granulates, certain additives may optionally be dosed-in.

The mixer 26 and the discharge device 24 in the weighing container 20 are controlled automatically by the control system 18 just as the dosing mechanisms 14.

By way of example, a condition shall at first be considered in which the weighing container 20 is empty and a new batch of a mixture of granulates with precisely specified mass ratios of the different types of granulates shall be prepared.

At first, while the discharge device 24 is closed, one of the dosing mechanisms 14 is opened so that the corresponding granulate trickles from the supply container 10 into the weighing container 20 via the outlet 12. As is known in the art, the weighing container 20 is supported on weighing cells (not shown), so that the increase in weight can be monitored while the granules trickle in. When the weight has increased by a predetermined amount, the dosing mechanism 14 is closed again. In a similar manner, the dosing mechanisms 14 for the other supply containers 10 are opened one after the other, so that the specified amount of each type of granulate is dosed into the weighing container 20.

When a certain amount of mixed granulates has been discharged into a plastifier (not shown) from the mixer 26 and the mixer is thus ready to receive a new batch of granulate and to mix the same, the discharge device 24 of the weighing container 20 is opened, so that the contents of the weighing container are dropped into the mixer 26 via the outlet 22 and via the inlet 28 of the mixer. Subsequently, the discharge device 24 is closed again and a new cycle may start.

From time to time, the dosing mechanisms 14 and the mixer 20 have to be subjected to maintenance and/or cleaning operations. In order to avoid a risk of injury, these operations may be performed only when the system is not running, i.e. when the drive system 16 for all dosing mechanisms and also the drive system for the mixer 26 are switched off.

In the example shown here, the weighing container 20 is designed and arranged such that it blocks access to the dosing mechanisms via the open outlets 12 and also blocks access to the mixer 26 via the inlet 28. On the top side, the weighing container 20 is closed by a lid 30 in which narrower feed-through openings 32 are formed for the outlets 12 of the supply containers. In the example shown, lid 30 is loosely supported on holders 34 arranged at the lower ends of the outlets 12. In this way the lid is held in a position above the open top end of the weighing container with a little spacing from that top end. Due to the inclined orientation of the outlets 12 and due to the relatively narrow openings 32, the lid 30 may not be lifted to such an extent that access to the interior of the outlets 12 and, therewith, to the dosing mechanisms 14 would be obtained. Likewise, the outlet 22 of the weighing container and a collar 36 attached thereto prevent access to the open inlet 28 of the mixer.

Consequently, the dosing mechanisms 14 and the mixer 26 can be accessed only when the weighing container 20 is removed as a whole.

In an alternative embodiment the lid could also rest on the top rim of the weighing container. Optionally, the lid could be replaced by a protective grid which permits the granules to trickle through but prevents that a person introduces her hand into the weighing container.

Figure 5:
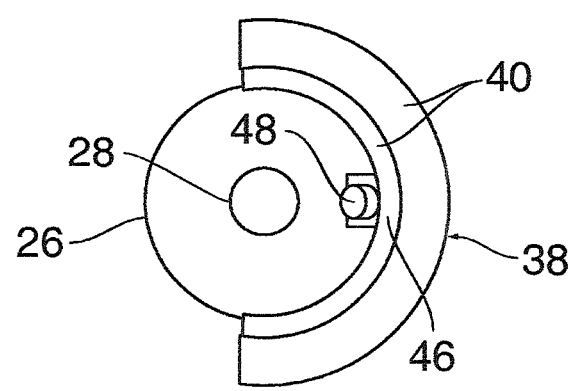
FIG. 5 is a plan view of a lower part of the system shown in FIG. 3.

In the example shown, the weighing container 20 rests with its funnel-shaped lower part on a framework 38 of which only two C-shaped frames 40 have been shown here, which frames straddle the conical lower part of the weighing container on a peripheral angle of slightly more than 180° (see also FIG. 5). Attached to the upper frame 40 is an upwardly projecting lock 42 which is straddled by a locking nose 44 that is secured to the weighing container 20. In this way, the weighing container 20 is prevented from being drawn horizontally (to the left side in FIG. 1) out of its operating position.

Further, a safety switch 48 is attached to the lower one of the frames 40 by means of a holder 46 such that it detects the conical peripheral surface of the weighing container 20. The safety switch 48 may for example be a contactless switch but is configured such that it produces a signal already as soon as the weighing container 20 is displaced from its operating position by a minor amount. The corresponding signal of the safety switch 48 is transmitted to the control system 18 and serves as a switch-off signal for the dosing mechanisms 14 and the mixer 26.

Figure 2:
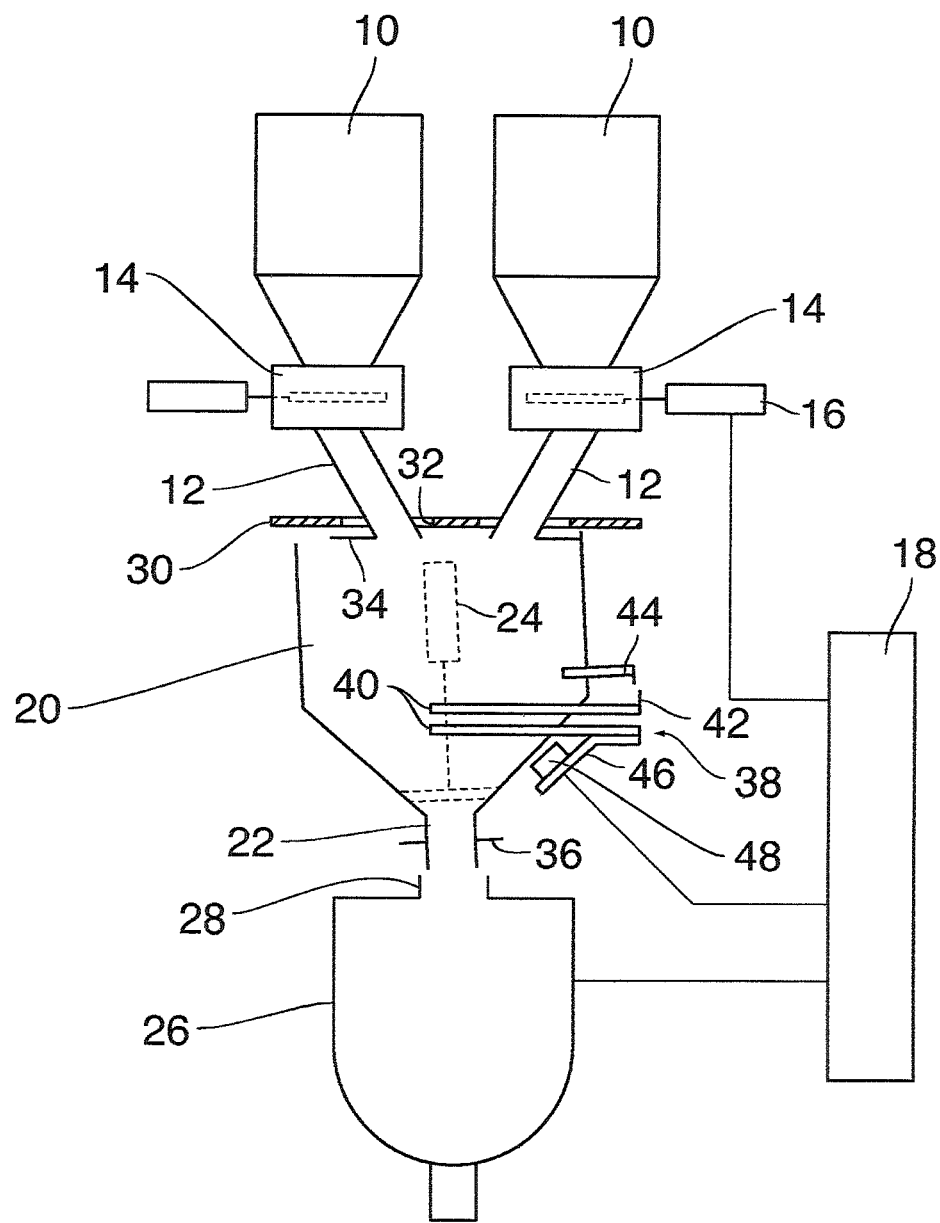
FIG. 2 shows the system of FIG. 1 in a condition in which a weighing container is being removed from the system.
Figure 3:
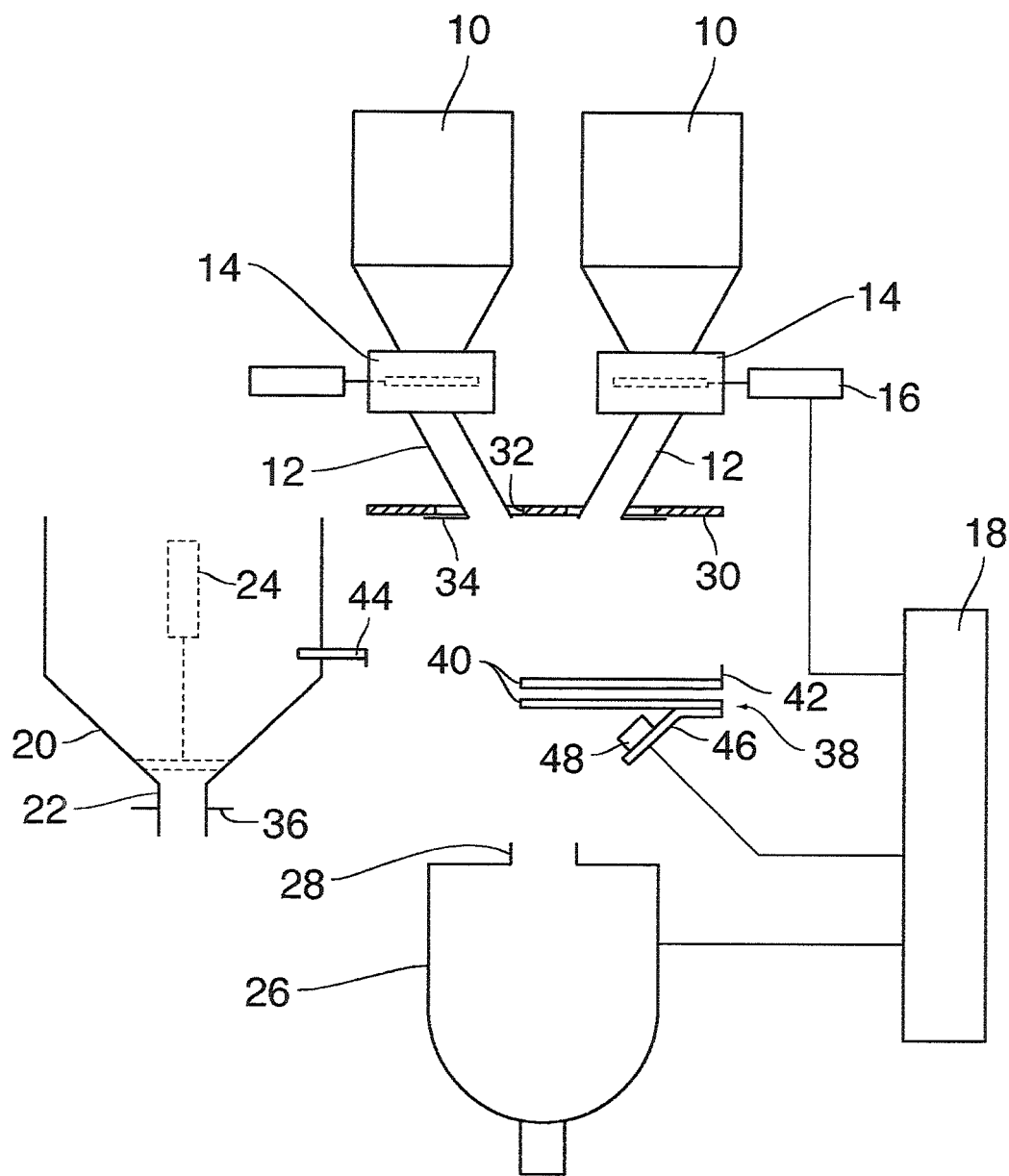
FIG. 3 shows the system in a state when the weighing container has been removed.

When, now, the weighing container 20 is to be removed in order to permit cleaning or maintenance of the dosing mechanisms 14 and/or the mixer 16, the weighing container 20 is slightly tilted about the free end of the upper frame 40 as has been shown in FIG. 2. Further, the weighing container is slightly pulled forward (to the left side in FIG. 2), so that the locking nose 44 is lifted over the lock 42. This movement also causes the lid 30 to be lifted preliminarily, so that it is lifted off the supports 34. This minor movement of the weighing container, which results in the condition shown in FIG. 2, is sufficient for triggering the safety switch 48, so that the mixer and the dosing mechanisms are switched off. Subsequently, the weighing container 20 may again be tilted into the normal position and may be drawn out horizontally (to the left side in FIG. 2), as has been shown in FIG. 3.

When the maintenance and cleaning operations have been completed, the weighing container may be re-installed in its position by reversing the movements described above, so that the safety switch 48 will again detect the presence of the weighing container 20. Then, the dosing mechanism 14 and the mixer 26 can be activated again.

Figure 4:
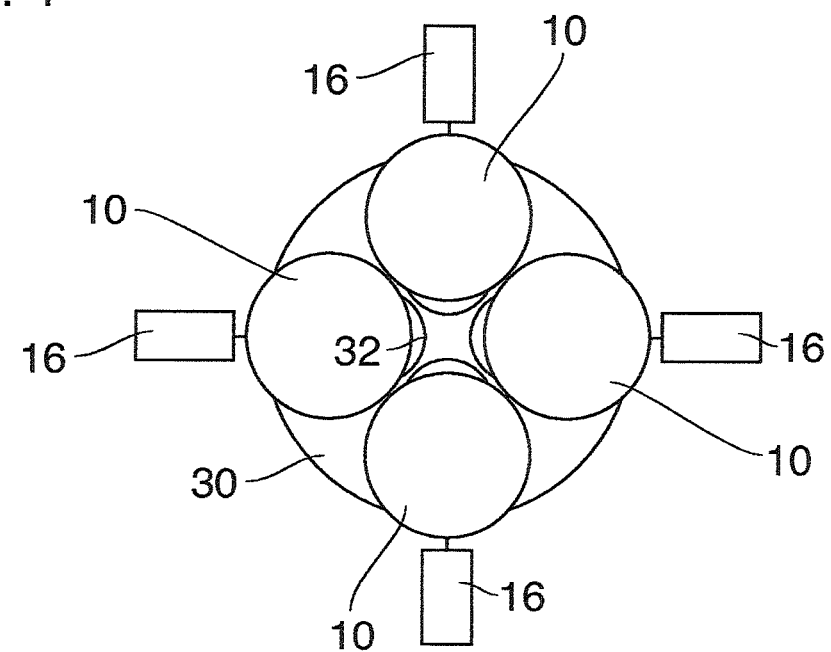
FIG. 4 is a plan view of a top part of the system shown in FIG. 3.

FIG. 4 shows a plan view of the upper part of the dosing system (down to and including the lid 30) and shows that a total of four supply containers 10 are distributed about the central axis of the system.

FIG. 5 shows a plan view of the lower part of the system (below the lid 30), but without the weighing container 20, showing in particular the shape of the frames 40 forming the framework 38.

The invention claimed is:

1. A granule dosing system for plastics processing machines comprising: a weighing container merely supported by resting on a framework so as to be removably retained in an operating position on the framework;
   a plurality of supply containers having outlets which are connected to an inlet of the weighing container via dosing mechanisms;
   a mixer with an inlet which is connected to an outlet of the weighing container at the same time that the outlets of the supply containers are positioned relative to an inlet of the weighing container;
   and a safety switch and a control device designed to switch off at least one of:
      the dosing mechanisms and
      the mixer when the safety switch emits a switch-off signal,
   wherein the weighing container is configured such that, in the operating position, it blocks access to both:
      the dosing mechanisms and
      the inlet of the mixer, and
   wherein the safety switch is arranged on the framework such that it emits the switch-off signal only when the weighing container is removed from the operating position.

2. The system according to claim 1, wherein the framework has a frame which is C-shaped in plan view and in which a funnel-shaped lower part of the weighing container is supported in the operating position.

3. The system according to claim 1, wherein the weighing container has a lid, which, in the operating position, blocks access to the outlets of the supply containers.

4. A granule dosing system for plastics processing machines comprising:
   a weighing container removably retained in an operating position on a framework;
   a plurality of supply containers having outlets which are connected to an inlet of the weighing container via dosing mechanisms;
   a mixer with an inlet which is connected to an outlet of the weighing container; and
   a safety switch and a control device designed to switch off at least one of:
      the dosing mechanisms and
      the mixer
   when the safety switch emits a switch-off signal,
      wherein the weighing container is configured such that, in the operating position, it blocks access to at least one of:

the dosing mechanisms and
the inlet of the mixer, and
wherein the safety switch is arranged on the framework such that it emits the switch-off signal when the weighing container is removed from the operating position,
wherein the framework has a frame which is C-shaped in plan view and in which a funnel-shaped lower part of the weighing container is supported in the operating position, and
wherein the safety switch is arranged on a side of the frame which is opposite to an open side of this frame, such that it faces a part of the funnel-shaped lower part of the weighing container and detects this part of the wall when the weighing container is in the operating position.

5. The system according to claim 4, in which a lock is arranged at the framework in a peripheral position in which the safety switch is located, said lock cooperating with a locking nose of the weighing container and preventing the weighing container to be moved horizontally in a direction towards the open side of the C-shaped frame.

6. A granule dosing system for plastics processing machines comprising:
a weighing container removably retained in an operating position on a framework;
a plurality of supply containers having outlets which are connected to an inlet of the weighing container via dosing mechanisms;
a mixer with an inlet which is connected to an outlet of the weighing container; and
a safety switch and a control device designed to switch off at least one of:
the dosing mechanisms and
the mixer
when the safety switch emits a switch-off signal,
wherein the weighing container is configured such that, in the operating position, it blocks access to at least one of:
the dosing mechanisms and
the inlet of the mixer, and
wherein the safety switch is arranged on the framework such that it emits the switch-off signal when the weighing container is removed from the operating position,
wherein the weighing container has a lid, which, in the operating position, blocks access to the outlets of the supply containers, and
wherein the lid is supported independently of the weighing container by resting loosely on holders fixed relative to the frame work.

* * * * *